E. A. WATSON.
DYNAMO ELECTRIC MACHINE.
APPLICATION FILED OCT. 24, 1921.

1,422,154.

Patented July 11, 1922.

Inventor
E. A. Watson,
By Marks & Clerk
Attys.

UNITED STATES PATENT OFFICE.

ERNEST ANSLEY WATSON, OF COVENTRY, ENGLAND, ASSIGNOR TO THE M-L MAGNETO SYNDICATE LIMITED, OF COVENTRY, ENGLAND.

DYNAMO-ELECTRIC MACHINE.

1,422,154.   Specification of Letters Patent.   Patented July 11, 1922.

Application filed October 24, 1921. Serial No. 510,098.

*To all whom it may concern:*

Be it known that I, ERNEST ANSLEY WATSON, a subject of the King of Great Britain and Ireland, residing at Victoria Works, West Orchard, Coventry, in the county of Warwick, England, have invented certain new and useful Improvements Relating to Dynamo-Electric Machines (for which I have filed an application in Great Britain, September 25, 1920, No. 27,361), of which the following is a specification.

This invention relates to small dynamo electric machines, such as current generators and ignition magnetos, in which laminated pole pieces are mounted between end pieces. The main object of the invention is to facilitate the construction of the field systems of such machines. A further object is to provide improved means for securing flat permanent magnets to the pole pieces.

The invention comprises the construction of each pole piece from a number of suitably shaped laminations which are held together loosely or rigidly to form a complete unit, and the location of the same by dowel or peg connections with the end pieces, the whole being secured by bolts or the like connecting the end pieces. Also the invention comprises the adaptation of the pole pieces to engage between them the ends of one or more flat permanent magnets, edgewise displacement of the magnets being prevented by the end pieces.

In the accompanying sheet of explanatory drawings:—

Figure 1:
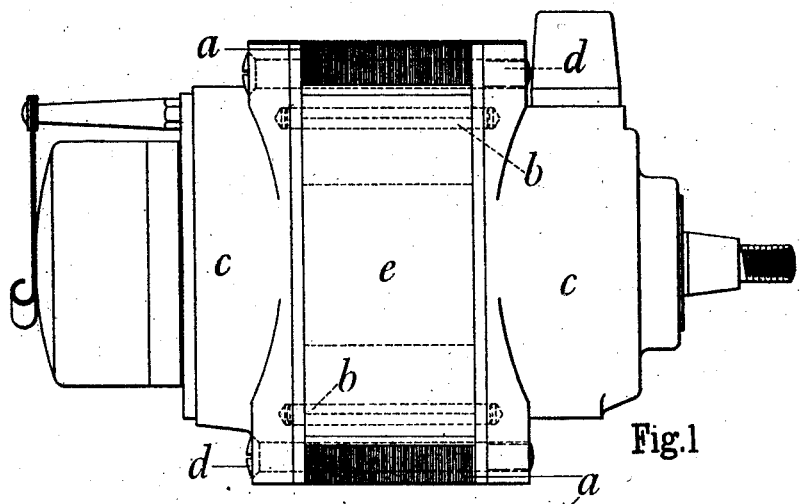
Figure 1 is a side elevation of a magneto fitted with pole pieces and magnets constructed and arranged in accordance with this invention.
Figure 2:
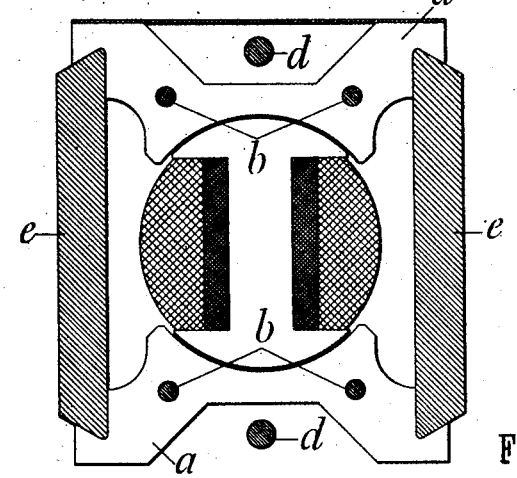
Figure 2 is a cross section of the machine.

In applying the invention as shown in Figures 1 and 2 to the field systems of a small electric current generator, or an ignition magneto, each pole piece *a* is constructed from a number of suitably shaped laminations which are held together either loosely or rigidly to form a unit, by dowels, or pegs *b* or by rivets, screws or the like passing laterally through them.

The dowels or pegs extend beyond the side faces of the pole pieces and the inner faces of the end pieces *c* of the machine are recessed to receive the dowels.

In assembling, the required number of pole pieces are engaged by means of the dowels or the like with the end pieces and the whole are secured together by two or more screws *d*, bolts, or like fastenings inserted through the end pieces. Such fastenings may be situated outside or clear of the pole pieces as shown, or they may pass through the same.

When it is desired to associate one or more flat or short bar permanent magnets *e* with the pole pieces, e. g., a pair of such magnets with the pole pieces arranged at their ends, the ends of the magnets are engaged with slots in the pole pieces. Thus the ends of the magnets may be chamfered or slipped into dovetail recesses in the pole pieces. The magnets are held in position partly by the pole pieces and partly by the end pieces, no separate fastenings for the magnets, such as screws, being then required.

In some two pole machines fitted with upper and lower pole pieces, the laminations forming the lower pole piece may be shaped to provide also a foot or base for the machine. Or a set of laminations may be cast with or otherwise secured to a solid metal base or foot.

Figure 3:
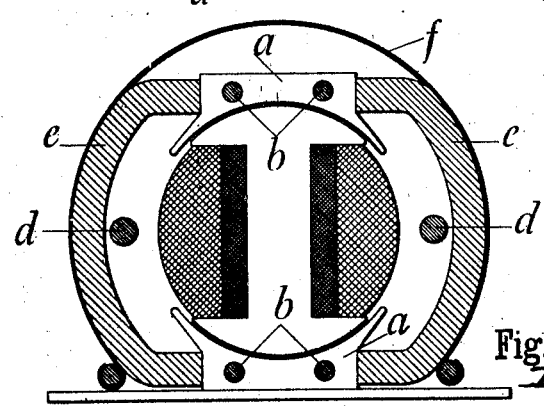
Figure 3 is a cross section illustrating an alternative construction.

When it is not desired to attach the magnets by means of the pole pieces, a construction as shown in Figure 3 may be employed. In this example the pole pieces *a* are constructed as above described, and the magnets *e* which are of curved form simply abut against the pole pieces and are held in position by a metal strap *f* which embraces the magnets and is attached at its ends to the base of the machine.

Having thus described my invention what I claim as new and desire to secure by Letters Patent is:

1. In a dynamo electric machine the combination of separate opposed end members having recesses in the inner faces thereof, permanent magnets confined between said end members, laminated pole pieces located between the end members having openings extending from end to end thereof alining with said recesses, removable pins located in said openings and being of greater length than said pole pieces and projecting beyond the ends of each of the latter, each pin having its opposite ends removably seated in two alined recesses in the opposed end members, and fastening means removed from the pole pieces and passing through the end members for securing the whole together.

2. In a dynamo electric machine, the combination of separate opposed end members having recesses in the inner faces thereof, flat permanent magnets confined between the end members, laminated pole pieces located between the end members having recessed portions accommodating the permanent magnets and preventing lateral displacement of the latter, said pole pieces also having an opening extending from end to end thereof alining with the recesses in the end members, removable pins located in said openings and being of greater length than said pole pieces and projecting beyond the ends of each of the latter, each pin having its opposite ends removably seated in two alined recesses in the opposed end members, and fastening means removed from the pole pieces and passing through the end members for securing the whole together.

In testimony whereof I have signed my name to this specification.

ERNEST ANSLEY WATSON.